D. HENDERSON.
WEIGHING ATTACHMENT FOR ICE TONGS.
APPLICATION FILED SEPT. 11, 1913.
1,107,422.
Patented Aug. 18, 1914.
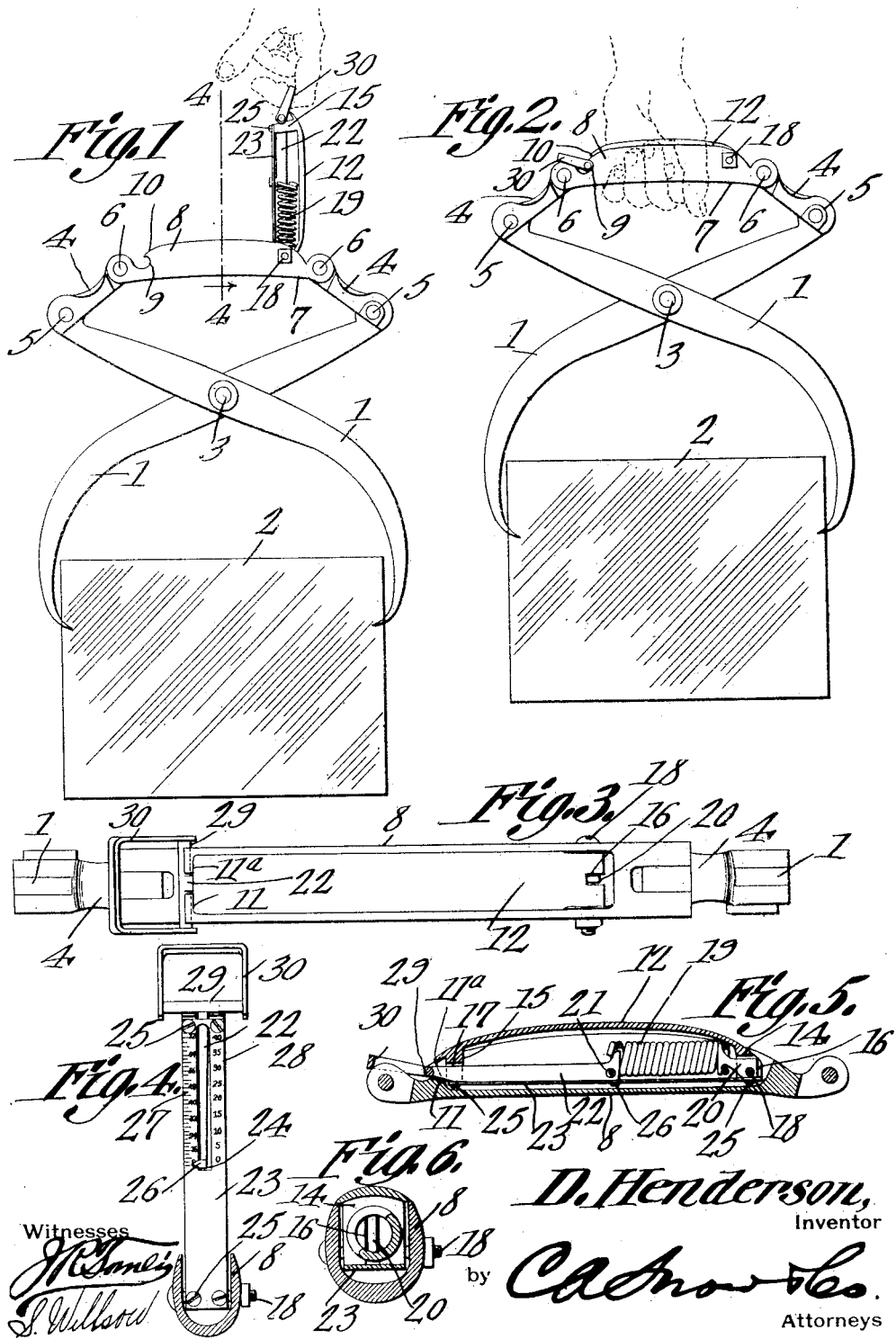
D. Henderson,
Inventor

UNITED STATES PATENT OFFICE.

DOUGLAS HENDERSON, OF DALLAS, TEXAS.

WEIGHING ATTACHMENT FOR ICE-TONGS.

1,107,422.  Specification of Letters Patent.  Patented Aug. 18, 1914.

Application filed September 11, 1913. Serial No. 789,367.

*To all whom it may concern:*

Be it known that I, DOUGLAS HENDERSON, a citizen of the United States, residing at Dallas, in the county of Dallas and State of Texas, have invented a new and useful Weighing Attachment for Ice-Tongs, of which the following is a specification.

The device forming the subject matter of this application is a pair of tongs of that general type which is employed for carrying ice or the like, the tongs being provided with means whereby the weight of the ice may be determined while the ice is engaged by the tongs.

One object of the present invention is to provide a pair of tongs including a weighing device which under normal conditions is out of action, and under no strain.

Another object of the invention is to provide a structure of the type above indicated, including a weighing device which may be housed securely against injury, in the handle.

Another object of the invention is to provide a pair of tongs comprising a weighing device, the weighing device including a spring which exercises a double function, in that it constitutes at once a counterpoise and a means for maintaining interlocked, two constituent members of a handle in which the weighing device is housed.

Another object of the invention is to provide novel means for connecting together the fixed and movable members of the handle and the counterpoise spring.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in side elevation and approximately in the position which the same will assume during the weighing operation; Fig. 2 is an elevation showing the tongs as the same will appear when the weighing device is not in use; Fig. 3 is a top plan of the structure shown in Figs. 1 and 2; Fig. 4 is a section taken approximately on the line 4—4 of Fig. 1; Fig. 5 is a longitudinal section of the handle; Fig. 6 is a cross section showing the secondary or closure member of the handle shut down upon the primary or body member of the handle.

In the drawings there is shown a pair of tongs which may be of any desired form, the tongs in the present instance being depicted as comprising intersecting jaws 1, which may be engaged with an article, such as a block of ice 2, the jaws 1 being connected at their point of intersection by a pivot element 3. Links 4 are shown, the lower ends of the links 4 being united with the upper ends of the jaws 1 by means of pivot elements 5. Pivot elements 6 connect the upper ends of the links 4 with a handle, denoted generally by the numeral 7.

The handle 7 is a composite structure and includes a trough-shaped primary member 8 with which the links 4 are immediately connected by the pivot elements 6. The side walls of the trough-shaped primary member 8 of the handle are equipped at one end with notches 9 defining projections, as will be understood best from Fig. 1. The upper edges of the side walls of the trough-shaped primary member 8 are beveled or inclined as indicated at 10 in the vicinity of the notches 9. The primary member 8 of the handle includes an end wall 11 provided in its upper edge with a notch 11ª, as will be understood best from Figs. 3 and 5.

The handle 7 includes, further, a secondary member or closure 12 equipped adjacent its ends with downwardly projecting lugs 14 and 15. There is a longitudinal slot 16 in the lug 14 and the lug 15 is provided with a longitudinal slot 17. A pivot element 18 passes through the side walls of the primary member 8 of the handle 7 and passes through the lug 14, across the slot 16 therein, the secondary member 12 thus being pivotally connected with the primary member 8, so that the secondary member 12, at the will of the operator, may be turned up into a vertical position as shown in Fig. 1.

A weighing device is carried by the relatively movable secondary member 12 and is housed within the contour of the relatively fixed, trough-shaped primary member 8 when the secondary member 12 is closed down upon the primary member 8, as shown in Fig. 2. This weighing device includes a retractile, helical spring 19 having adjacent one end a foot 20. The foot 20, as will be understood best from Fig. 5 lies in the slot 16 of the lug 14 of the secondary member 12 and the pivot element 18 passes through the foot 20. The pivotal element 18 serves not only to connect the primary member 8 of the handle with the secondary member 12 thereof but, as well, serves as a point of attachment for the inner end of the spring 19. The outer end of the spring 19 passes through a hole 21 in a bar 22, or is otherwise connected therewith, the bar 22, as will be made evident hereinafter, constituting a weight indicating element, the bar 22 being mounted to reciprocate behind a dial plate 23 having a slot 24 and secured by means of screws 25 or the like to the ends of the lugs 16 and 14 of the relatively movable secondary member 12 which constitutes a part of the handle. The bar 22 includes a finger 26 mounted to move in the slot 24 of the dial plate 23 and adapted to coöperate with a weight scale 27 and a price scale 28, the scales 27 and 28, respectively, being inscribed upon the dial plate 23 upon opposite sides of the slot 24. The bar 22 passes outwardly through the slot 17 in the lug 15 and is terminally provided with a transverse head 29 to which is pivoted a yoke or suspension member 30.

Presupposing that the parts are positioned as shown in Fig. 1, the operation of the structure is as follows:—The weight of the block of ice 2 will be transmitted to the following elements: the jaws 1, the links 4, the primary member 8 of the handle 7, the pivot element 18, the spring 19, the bar 22, the yoke 20, and thence into the hand of the operator. The spring 19 will yield and the indicating finger 26 which constitutes a part of the bar 22 will move with respect to the scales 27 and 28 on the dial plate 23, and thus indicate the weight of the piece of ice 2 and the price thereof. To position the parts as shown in Fig. 2, the secondary member 12 of the handle 7 is swung downwardly, whereupon the head 21 will slide along the beveled edges 10 of the primary member 8 and interlock with the notches 9, the bar 22 entering the slot 11ª of the end wall 11 of the primary member 8. When the head 29 is engaged in the notches 9, the spring 19 is under tension. It will therefore be seen that the spring 19 exercises two functions: first, when the parts are positioned as shown in Fig. 1, the spring acts as a counterpoise, and secondly, when the parts are positioned as shown in Fig. 2, the spring acts as a means for maintaining the interlocking parts 29 and 9 in engagement.

When the weighing device is not in use, as shown in Fig. 2, the same is housed within the contour of the handle, the secondary member 12 being closed down upon the primary member 8. The device, therefore, is shielded and protected, and is not likely to be injured even though the tongs be thrown about or otherwise handled carelessly.

Having thus described the invention, what is claimed is:—

1. In a device of the class described, a handle comprising a relatively fixed member and a movable member pivoted to the fixed member and coöperating with the fixed member to form an intermediate grip portion in the handle; a weighing device carried by the movable member and housed within the handle when the movable member is closed upon the relatively fixed member; and a pair of tongs connected with the relatively fixed member upon opposite sides of said grip portion.

2. In a device of the class described, a handle for tongs, comprising a relatively fixed member and a movable member pivoted thereto; a weighing device carried by the movable member and including a weight indicating element, the weight indicating element and the relatively fixed member having interlocking parts coacting to hold the movable member closed upon the relatively fixed member; and a spring connected with the weight indicating element and constituting at times, a counterpoise and a means for holding said interlocking parts in engagement.

3. In a device of the class described, a handle for tongs, comprising a relatively fixed member and a movable member; a weighing device carried by the movable member and housed in the handle when the movable member is closed upon the relatively fixed member, the weighing device including a weight indicating element and a counterpoise spring connected therewith; and a single pivot element connecting the relatively fixed member with the movable member and operatively with the spring.

4. In a device of the class described, a handle for tongs, comprising a trough-shaped, relatively fixed member having a projection at one end and provided with a beveled edge located adjacent the projection, and a relatively movable closure member for the fixed member, the members being pivotally connected; a dial carried by the closure; a bar mounted to slide adjacent the dial and having means for registering on the dial, the bar including a transverse head adapted to travel the beveled edge of the relatively fixed member and to lock behind the projection; and a spring uniting the bar with one member of the handle, the spring constituting a counterpoise and a means for holding the head engaged with the projection.

In testimony that I claim the foregoing as my own, I have hereto affixed my signature in the presence of two witnesses.

DOUGLAS HENDERSON.

Witnesses:
T. F. FRAZIER,
E. P. KING.